United States Patent
Dunne et al.

(10) Patent No.: US 11,888,919 B2
(45) Date of Patent: *Jan. 30, 2024

(54) DETERMINING QUALITY OF EXPERIENCE FOR COMMUNICATION SESSIONS

(71) Applicants: International Business Machines Corporation, Armonk, NY (US); National University of Ireland Maynooth, Kildare (IE)

(72) Inventors: Jonathan Dunne, Dungarvan (IE); Paul B. French, Cork (IE); James P. Galvin, Jr., Georgetown, KY (US); Patrick J. O'Sullivan, Ballsbridge (IE); Hitham Ahmed Assem Aly Salama, Blanchardstown (IE)

(73) Assignee: International Business Machines Corporation, Armonk, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 16/508,478

(22) Filed: Jul. 11, 2019

(65) Prior Publication Data
US 2021/0014296 A1   Jan. 14, 2021
US 2022/0385716 A9   Dec. 1, 2022

Related U.S. Application Data

(63) Continuation of application No. 16/106,218, filed on Aug. 21, 2018, now Pat. No. 10,397,067, which is a
(Continued)

(51) Int. Cl.
*H04L 65/80* (2022.01)

(52) U.S. Cl.
CPC .................................. *H04L 65/80* (2013.01)

(58) Field of Classification Search
CPC . H04L 65/80; H04L 41/5067; H04L 43/0829; H04L 43/087; H04L 43/0852;
(Continued)

(56) References Cited

U.S. PATENT DOCUMENTS 6,748,433 B1   6/2004   Yaakov
7,280,487 B2   10/2007  Goodman
(Continued)

FOREIGN PATENT DOCUMENTS

EP   1156621 A2   11/2001
EP   2571195 A1    3/2013
(Continued)

OTHER PUBLICATIONS

Cherif, Wael, et al. "A_PSQA: PESQ-like non-intrusive tool for QoE prediction in VoIP services." 2012 IEEE International Conference on Communications (ICC). IEEE, 2012. (Year: 2012).*
(Continued)

*Primary Examiner* — Soe Hlaing
(74) *Attorney, Agent, or Firm* — Peter J. Edwards

(57) ABSTRACT

A computer-implemented method, computer program product, and computing system is provided for determining quality of experience for communication sessions. In an implementation, a method may include determining a plurality of intrusive quality of experience scores associated with a plurality of intrusive audio transmission samples. The method may also include determining a plurality of non-intrusive quality of experience scores associated with a plurality of non-intrusive audio transmission samples. The method may further include deriving a quality of experience coefficient based upon a relationship between the plurality of intrusive quality of experience scores and the plurality of non-intrusive quality of experience scores.

20 Claims, 7 Drawing Sheets

Related U.S. Application Data continuation of application No. 14/198,666, filed on Mar. 6, 2014, now Pat. No. 10,158,537, which is a continuation of application No. 14/085,036, filed on Nov. 20, 2013, now Pat. No. 10,148,526.

(58) Field of Classification Search
CPC ............ H04L 65/1083; H04N 21/2402; H04N 21/44209
See application file for complete search history.

(56) References Cited

U.S. PATENT DOCUMENTS

| | | | |
|---|---|---|---|
| 8,370,132 | B1 | 2/2013 | Conway |
| 8,588,065 | B2 | 11/2013 | Liu |
| 8,908,049 | B2 | 12/2014 | Adams |
| 9,042,347 | B1 | 5/2015 | Oroskar |
| 9,271,055 | B2 | 2/2016 | Karacali-Akyamac |
| 9,396,738 | B2 | 7/2016 | Abdelal |
| 9,426,569 | B2 | 8/2016 | Forrester |
| 10,148,526 | B2 * | 12/2018 | Dunne ............... H04L 41/509 |
| 2002/0001395 | A1 | 1/2002 | Davis |
| 2002/0167936 | A1 | 11/2002 | Goodman |
| 2003/0103645 | A1 | 6/2003 | Levy |
| 2003/0119515 | A1 | 6/2003 | Holler |
| 2003/0170391 | A1 | 9/2003 | Nishino |
| 2003/0171922 | A1 | 9/2003 | Beerends |
| 2004/0170164 | A1 | 9/2004 | LeBlanc et al. |
| 2005/0100113 | A1 | 5/2005 | Corts |
| 2006/0092963 | A1 | 5/2006 | Bakre |
| 2006/0153174 | A1 | 7/2006 | Towns-von Stauber |
| 2006/0233114 | A1 | 10/2006 | Alam et al. |
| 2006/0280313 | A1 | 12/2006 | Schmidmer et al. |
| 2007/0053303 | A1 | 3/2007 | Kryuchkov |
| 2007/0291655 | A1 | 12/2007 | Moore |
| 2008/0291842 | A1 | 11/2008 | Isambart et al. |
| 2009/0018825 | A1 | 1/2009 | Bruhn |
| 2009/0238371 | A1 | 9/2009 | Rumsey et al. |
| 2010/0292993 | A1 | 11/2010 | Vaillancourt et al. |
| 2011/0313758 | A1 | 12/2011 | Grancharov |
| 2012/0013748 | A1 | 1/2012 | Stanwood |
| 2012/0020484 | A1* | 1/2012 | Grancharov ......... H04M 3/2236 381/56 |
| 2012/0059650 | A1 | 3/2012 | Faure et al. |
| 2012/0113270 | A1 | 5/2012 | Spracklen |
| 2012/0294164 | A1 | 11/2012 | Leventu |
| 2013/0083203 | A1 | 4/2013 | Barrett |
| 2013/0148525 | A1 | 6/2013 | Sanchez |
| 2013/0170391 | A1 | 7/2013 | Feiten et al. |
| 2013/0297743 | A1 | 11/2013 | Eschet |
| 2013/0329595 | A1* | 12/2013 | Scholz .................... H04L 43/08 370/252 |
| 2013/0343222 | A1 | 12/2013 | Chen |
| 2014/0101328 | A1 | 4/2014 | Coulombe |
| 2014/0219350 | A1 | 8/2014 | Liao |
| 2014/0358526 | A1 | 12/2014 | Abdelal |
| 2015/0006164 | A1 | 1/2015 | Lu |
| 2015/0073785 | A1 | 3/2015 | Sharma et al. |

FOREIGN PATENT DOCUMENTS

| | | |
|---|---|---|
| WO | 2011141586 A1 | 11/2011 |
| WO | 2012113511 A1 | 8/2012 |

OTHER PUBLICATIONS

Voznak, Miroslav. "E-model modification for case of cascade codecs arrangement." (2011), International Journal of Mathematical Models and Methods in Applied Sciences, Issue 8, vol. 5. (Year: 2011).*

Kovac, Adrian, and Michal Halas. "E-model mos estimate precision improvement and modelling of jitter effects." Advances in Electrical and Electronic Engineering 10.4 (2012): 276-281. (Year: 2012).*

Sharma et al., "Non-lntrusive Codec identification Algorithm," IEEE, 978-1-4673-0046 2012, ICASSP 2012, pp. 447-4480.

Berger et al., Hybrid Perceptual/Bitstream Group Test Plan, Draft Version 2.9, Jun. 10, 2009 and Apr. 2011, Draft VQEG Hybrid Testplan, pp. 1-72.

Khan et al., "QoE Prediction Model and its Application in Video Quality Adaptation Over UMTS Networks," IEEE Transactions on Multimedia, vol. 14, No. 2, Apr. 2012, pp. 431-442.

Jelassi et al., Quality of Experience of VoIP Service: A Survey of Assessment Approaches and Open Issues, IEEE Communications Surverys & Tutorials, vol. 14, No. 2, Second Quarter 2012, pp. 491-513.

Sun et al., VoIP Quality of Experience (QoE) Chapter 6, Guide to Voice and Video Over IP, Computer Communications and Networks, DOI 10.1007/978-1-4471-4905-7_6, pp. 123-162.

Moeller et al., Speech Quality Estimation, IEEE Signal Processing Magazine, Nov. 2011, pp. 18-28.

Winkler et al., "The Evolution of Video Quality Measurement: From PSNR to Hybrid Metrics," IEEE Transactions on Broadcasting, vol. 54, No. Sep. 3, 2008, pp. 660-668.

Alreshoodi; Survey on Qoe/Qos Correlation Models For Multimedia Services; c2013.

Jammeh: Quality of Experience (QoE) Driven Adaption Scheme for Voice/ideo Over IP; c2010.

Schatz; From Packets to People: Quality of Experience as a New Measurement Challenge.

Packet Layer Video Quality Assessement Model: c2011.

G.1010 Specification flyer; c2001.

Falk et al., Hybrid Signal-and-Link-Parametric Approach to Single-Ended Quality Measurement of Packetized Speech, c2007.

Conway: Analyzing Voice-over-IP Subjective Quality as a Function of Network QoS; c2002.

Audio System measurements Wikipedia page; available at least Jun. 9, 2013.

Reynolds, Rix; Quality VOIP; c2001.

VQEG Hybrid Testplan; copyright 2011.

Quality of Experience of VOIP; copyright 2012.

Speech Quality Estimation; copyright 2011.

QoE Prediction Model; copyright 2012.

VOIP Quality of Experience, copyright 2013.

p. 564 specification c2007.

"Series P: Telephone Transmission Quality, Telephone Installations, Local Line Networks," Methods for objective and subjective assessment of quality, ITU-T, International Telecommunication Union, p. 861, Feb. 1998, 43 pages.

"Series P: Terminals and Subjective and Objective Assessment Methods," Methods for objective and subjective assessment of speech quality, ITU-T, International Telecommunication Union, p. 863, Jan. 2011, 76 pages.

Rix et al., "The Perceptual Analysis Measurement System for Robust End-To-End Speech Quality Assessment," BT Advanced Communications Research, IEEE, Acoustics, Speech, and Signal Processing, Feb. 2000, 4 pages.

"Series P: Telephone Transmission Quality, Telephone Installations, Local Line Networks," Objective measuring apparatus, ITU-T, International Telecommunication Union, p. 564, Nov. 2007, 32 pages.

"Series P: Telephone Transmission Quality," Methods for objective and subjective assessment of quality, ITU-T, International Telecommunication Union, p. 800, Aug. 1996, 37 pages.

"Series P: Telephone Transmission Quality, Telephone Installations, Local Line Networks," Methods for objective and subjective assessment of quality, ITU-T, International Telecommunication Union, p. 862, Feb. 2001, 30 pages.

* cited by examiner

DETERMINING QUALITY OF EXPERIENCE FOR COMMUNICATION SESSIONS

RELATED APPLICATIONS

The subject application is a continuation application of U.S. patent application with Ser. No. 16/106,218, filed on Aug. 21, 2018, which is a continuation application of U.S. patent application with Ser. No. 14/198,666, filed on Mar. 6, 2014, now U.S. Pat. No. 10,158,537, issued on Dec. 18, 2018, which is a continuation application of U.S. patent application with Ser. No. 14/085,036, filed on Nov. 20, 2013, now U.S. Pat. No. 10,148,526, issued on Dec. 4, 2018, the entire contents of which are herein incorporated by reference.

TECHNICAL FIELD

The present disclosure generally relates to systems and method for electronic communications, and more particularly relates to determining quality of experience for electronic communication sessions.

BACKGROUND

Various collaboration systems exist for enabling individuals to engage in collaborate activities, such as working together on projects, sharing information, and the like. Collaboration systems can be particularly useful in allowing geographically dispersed individuals to interact and work with one another. Using various different collaboration systems, or multi-functional collaboration systems, individuals who are geographically remote from one another may, for example, engage in common work projects, for example, using online team work spaces, participate in interactive discussions, for example, using teleconferencing or video conferencing systems, and engage in meetings, for example, using electronic meeting systems that allow for presentations, lectures, seminars, and the like.

SUMMARY OF DISCLOSURE

According to an implementation, a computer-implemented method may include determining a plurality of intrusive quality of experience scores associated with a plurality of intrusive audio transmission samples. The method may also include determining a plurality of non-intrusive quality of experience scores associated with a plurality of non-intrusive audio transmission samples. The method may further include deriving a quality of experience coefficient based upon a relationship between the plurality of intrusive quality of experience scores and the plurality of non-intrusive quality of experience scores.

One or more of the following features may be included. Each of the plurality of intrusive quality of experience scores may be based upon, at least in part, a comparison of a transmitted audio signal and a received audio signal. The plurality of intrusive quality of experience scores may be determined for a respective plurality of different network conditions.

Each of the plurality of non-intrusive quality of experience scores may be based upon, at least in part, identified network conditions. The plurality of non-intrusive quality of experience scores may be determined for a respective plurality of different network conditions.

The derived quality of experience coefficient may be a codec specific coefficient. The method may further include determining a non-intrusive quality of experience associated with an audio transmission. The codec specific coefficient may be applied to the non-intrusive quality of experience score to obtain a corrected quality of experience metric.

According to another implementation, a computer program product includes a computer readable medium having a plurality of instructions stored on it. When executed by a processor, the instructions may cause the processor to perform operations including determining a plurality of intrusive quality of experience scores associated with a plurality of intrusive audio transmission samples. Instructions may be include for determining a plurality of non-intrusive quality of experience scores associated with a plurality of non-intrusive audio transmission samples. Instructions may further be included for deriving a quality of experience coefficient based upon a relationship between the plurality of intrusive quality of experience scores and the plurality of non-intrusive quality of experience scores.

One or more of the following features may be included. Each of the plurality of intrusive quality of experience scores may be based upon, at least in part, a comparison of a transmitted audio signal and a received audio signal. The plurality of intrusive quality of experience scores may be determined for a respective plurality of different network conditions.

Each of the plurality of non-intrusive quality of experience scores may be based upon, at least in part, identified network conditions. The plurality of non-intrusive quality of experience scores may be determined for a respective plurality of different network conditions.

The derived quality of experience coefficient may be a codec specific coefficient. Instructions may also be included for determining a non-intrusive quality of experience associated with an audio transmission. The codec specific coefficient may be applied to the non-intrusive quality of experience score to obtain a corrected quality of experience metric.

According to another implementation, a computing system includes a processor and a memory module coupled with the processor. The processor may be configured for determining a plurality of intrusive quality of experience scores associated with a plurality of intrusive audio transmission samples. The processor may also be configured for determining a plurality of non-intrusive quality of experience scores associated with a plurality of non-intrusive audio transmission samples. The processor may further be configured for deriving a quality of experience coefficient based upon a relationship between the plurality of intrusive quality of experience scores and the plurality of non-intrusive quality of experience scores.

One or more of the following features may be included. Each of the plurality of intrusive quality of experience scores may be based upon, at least in part, a comparison of a transmitted audio signal and a received audio signal. The plurality of intrusive quality of experience scores may be determined for a respective plurality of different network conditions.

Each of the plurality of non-intrusive quality of experience scores may be based upon, at least in part, identified network conditions. The plurality of non-intrusive quality of experience scores may be determined for a respective plurality of different network conditions.

The derived quality of experience coefficient may be a codec specific coefficient.

The details of one or more implementations are set forth in the accompanying drawings and the description below.

Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
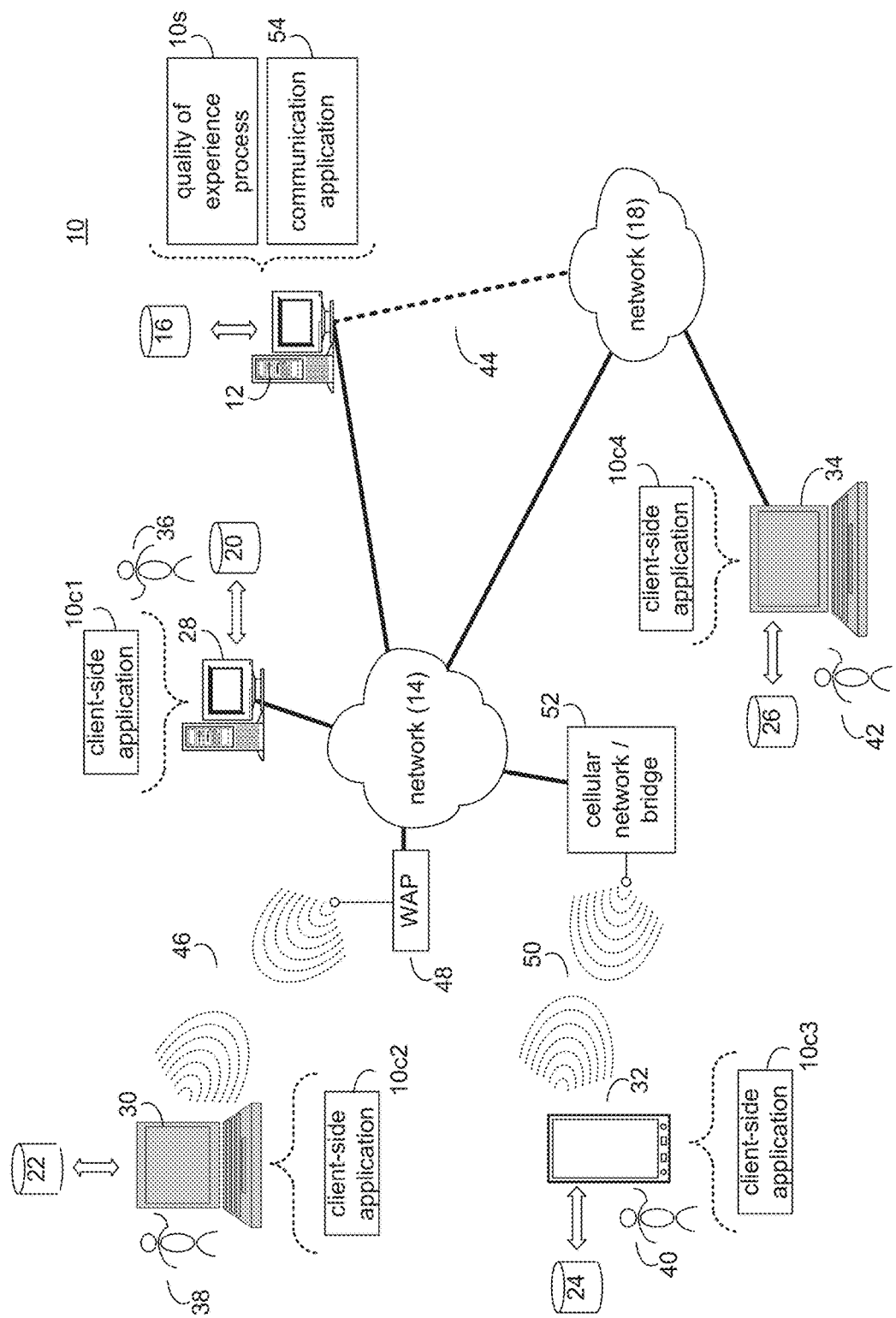
FIG. 1 is a diagrammatic view of a distributed computing network including a computing device that executes a quality of experience process according to an implementation of the present disclosure.

Individuals may often engage in communication sessions, utilizing a data network for conveying the communications. Such communication sessions may include, for example, Voice-over-IP and Video-over-IP communications, in which the communications to and from each party may be conveyed as packetized data over a data network. The quality of these types of communications can be greatly effected by network conditions. For example, packet loss may be one important factor that may impact the perceived quality of experience of the individuals participating in a communication session. As packet loss increases the quality of the communication may be degraded, for example with the individuals experiencing broken or garbled audio signals, increased interference and noise, and the like. Various other network conditions may also impact the quality of the communication.

Consistent with the present disclosure, the quality of experience associated with a media transmission, such as a Voice-over-IP or Video-over-IP communication, an Internet Protocol TV broadcast, etc., may be determined. In some implementations, the present disclosure may allow non-intrusive monitoring methods to be implemented that may provide audio quality assessments that may have a degree of accuracy that may generally be similar to audio quality assessments achievable through intrusive audio quality measurement assessments. The ability to achieve such relatively high accuracy audio quality assessments through non-intrusive monitoring may allow real-time and/or near real-time audio accuracy assessments to be conducted on an ongoing media transmission, such as a communication session. Real-time and/or near real-time audio quality assessments may allow corrective action, such as adaptive algorithms, different error correction codes, and the like to be implemented to provide improved audio quality. In some embodiments, the present disclosure may be implemented in connection with ITU (International Telecommunication Union) standardized codec and/or may be implemented in connection with non-ITU standardized codecs, such as SILK, ISAC, ILBC, SPEEX, etc.

In an embodiment, the present disclosure may allow network conditions, or quality of service factors, such as packet loss, jitter, delay, burst ratio, and the like, to the mapped to a quality of experience metric that may provide an accuracy that may be generally similar to audio quality assessment accuracy achieved using intrusive quality of experience assessment. For example, a quality of experience coefficient may be derived bases upon, at least in part, a mapped relationship between a plurality of quality of experience scores determined using an intrusive assessment technique and a plurality of quality of experience scores determined using a non-intrusive assessment technique. In an embodiment, the quality of experience coefficient may be applied to quality of experience scores determined using a non-intrusive assessment technique to obtain a corrected quality of experience metric. The corrected quality of experience metric may, in some embodiments, have an accuracy generally similar to a quality of experience metric determined using an intrusive assessment technique, but may be obtainable in real-time and/or near real time.

Referring to FIG. 1, there is shown quality of experience process 10. For the following discussion, it is intended to be understood that quality of experience process 10 may be implemented in a variety of ways. For example, quality of experience process 10 may be implemented as a server-side process, a client-side process, or a server-side/client-side process.

For example, quality of experience process 10 may be implemented as a purely server-side process via quality of experience process 10s. Alternatively, quality of experience process 10 may be implemented as a purely client-side process via one or more of client-side application 10c1, client-side application 10c2, client-side application 10c3, and client-side application 10c4. Alternatively still, quality of experience process 10 may be implemented as a server-side/client-side process via server-side quality of experience process 10s in combination with one or more of client-side application 10c1, client-side application 10c2, client-side application 10c3, and client-side application 10c4. In such an example, at least a portion of the functionality of quality of experience process 10 may be performed by quality of experience process 10s and at least a portion of the functionality of quality of experience process 10 may be performed by one or more of client-side application 10c1, 10c2, 10c3, and 10c3.

Accordingly, quality of experience process 10 as used in this disclosure may include any combination of quality of experience process 10s, client-side application 10c1, client-side application 10c2, client-side application 10c3, and client-side application 10c4.

Figure 2:
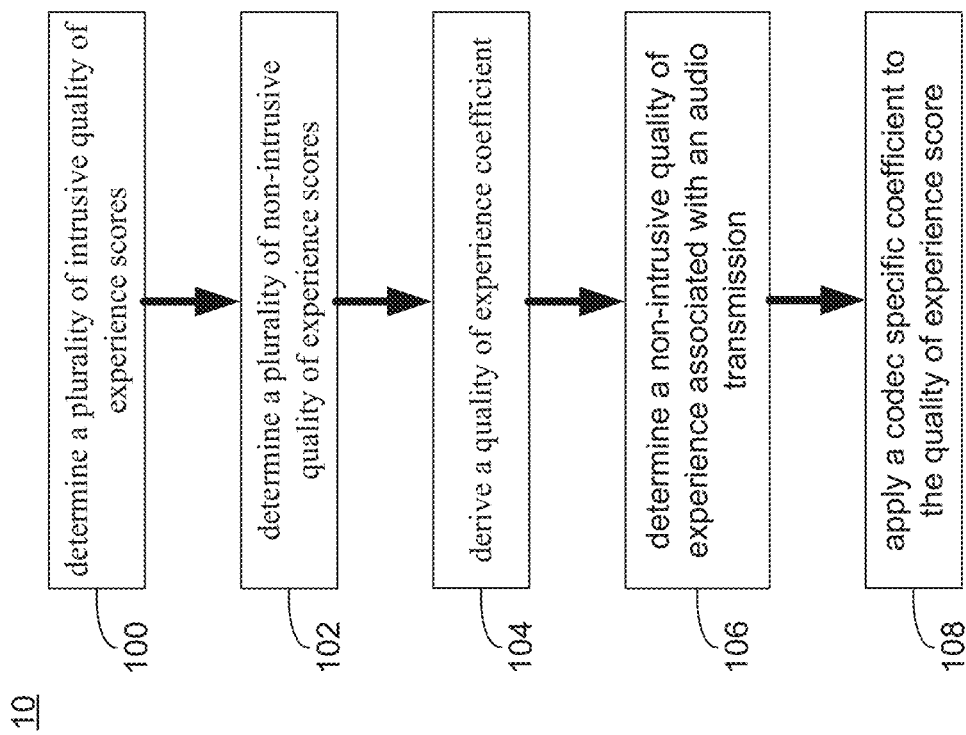
FIG. 2 is a flowchart of the quality of experience process of FIG. 1, according to an implementation of the present disclosure.

Referring also to FIG. 2, and as will be discussed in greater detail below, quality of experience process 10 may determine 100 a plurality of intrusive quality of experience scores associated with a plurality of intrusive audio transmission samples. Quality of experience process 10 may also determine 102 a plurality of non-intrusive quality of experience scores associated with a plurality of non-intrusive audio transmission samples. Quality of experience process 10 may further derive 104 a quality of experience coefficient based upon a relationship between the plurality of intrusive quality of experience scores and the plurality of non-intrusive quality of experience scores.

Quality of experience process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of quality of experience process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of a voice-over-IP application, a video-over-IP application, a streaming media application (e.g., capable of receiving and/or rendering streaming media such as streaming audio and/or streaming video, e.g., IP television, etc.), a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access quality of experience process 10 directly through network 14 or through secondary network 18. Further, quality of experience process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, quality of experience process 10 may communicate with, interact with, and/or include a component or module of a media application (e.g., communication application 54). As is generally known, in some embodiments, a media application (e.g., communication application 54) may generally facilitate audio and/or video communications between individuals as participants in a communication session. For example, communication application 54 may facilitate voice over IP and/or video over IP communications between communication session participants. In various embodiments, a communication session may only include two participants, or may include more than two participants. In some embodiments, communication application 54 may include, and/or may interact with, for example, an electronic meeting application, a web conferencing application, or a similar application. An example of communication application 54 may include, but is not limited to, IBM® Sametime®. (Lotus and Sametime are registered trademarks of International Business Machine Corporation in the United States, other countries, or both).

In other embodiments, a media application may provide streaming media for consumption by end users. Examples of streaming media may include streaming video media and/or streaming audio media. An example of streaming media may include, but is not limited to, internet protocol television (e.g., IPTV). Various other forms of streaming media may be similarly utilized. While the present disclosure may generally be set forth by way of illustrative examples relating to communications between participants in a communication session, other embodiments involving the provision and/or consumption of streaming media will be appreciated.

In an embodiment, the instruction sets and subroutines of communication application 54 may be stored, e.g., on storage device 16 associated with server computer 12, which executes communication application 54, and/or another suitable storage device. Further, users (e.g., one or more of users 36, 38, 40, 42) may access communication application 54 in order to participate in an electronic communication session (such as a voice call, a video call, an electronic meeting, or other communication session type). The users may access communication application 54 via one or more suitable applications, such as client side applications 10c1-10c4 (e.g., which may include a voice-over-IP application, a video-over-IP application, a web browser, a client electronic meeting application, or another application) and/or via a different application (not shown). As generally discussed above, a portion and/or all of the functionality of quality of experience process 10 may be provided by one or more of client side applications 10c1-10c4. For example, in some embodiments quality of experience process 10 (and/or client-side functionality of quality of experience process 10) may be included within and/or interactive with client-side applications 10c1-10c4, which may include client side electronic communication applications, web browsers, or another application. Various additional/alternative configurations may be equally utilized.

As generally discussed above with reference to FIG. 2, quality of experience process 10 determine 100 a plurality of intrusive quality of experience scores associated with a plurality of intrusive audio transmission samples. Quality of experience process 10 may also determine 102 a plurality of non-intrusive quality of experience scores associated with a plurality of non-intrusive audio transmission samples. Quality of experience process 10 may further derive 104 a quality of experience coefficient based upon a relationship between the plurality of intrusive quality of experience scores and the plurality of non-intrusive quality of experience scores.

As generally discussed above, quality of experience process 10 may allow relationships between the results of intrusive testing and the result of non-intrusive testing to be determined. The relationship may be represented as a derived quality of experience coefficient that may be utilized to correcting non-intrusive quality of experience assessments to provide an accuracy that may, in some implementations, be similar in accuracy to quality of experience assessments achieved utilizing intrusive quality of experience assessment techniques.

Figure 3:
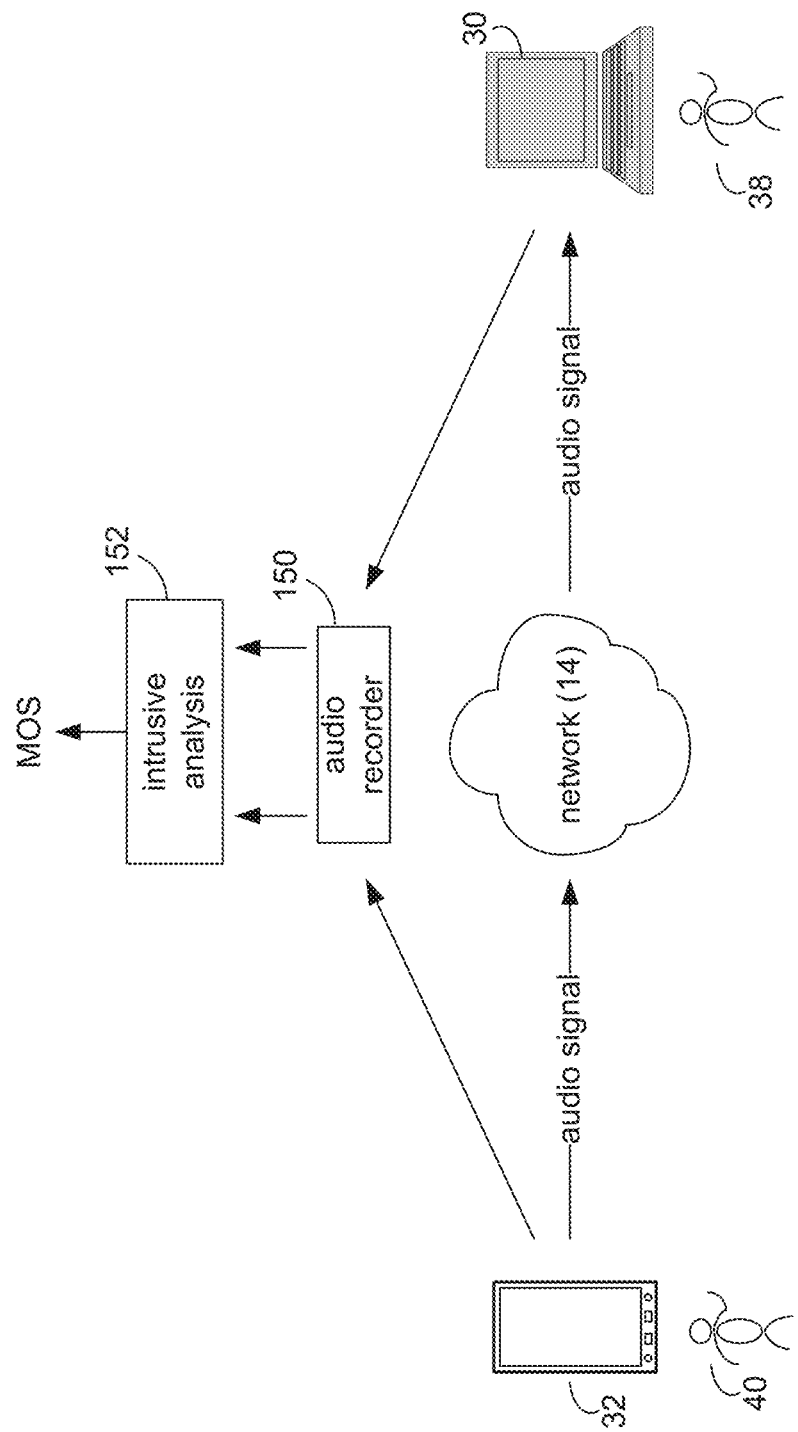
FIG. 3 diagrammatically depicts an implementation of the quality of experience process of FIG. 1, according to an example embodiment.

Referring also to FIG. 3, quality of experience process 10 determine 100 a plurality of intrusive quality of experience scores associated with a plurality of intrusive audio transmission samples. For example, a communication session (or other media transmission) may be established, e.g., between a transmitter side (e.g., mobile computing device 32) and a receiver side (e.g., notebook computer 30) through a data network (e.g., network 14). For example, the communication session may include a Voice-over-IP call between user 40 and user 38, via mobile computing device 32 and notebook computer 30, respectively. While the communication session may include a bidirectional audio transmissions, for the purpose of explanation, mobile computing device 32 may be identified as a transmitter side device and notebook computer 30 may be identified as a receiver side device. The communication session may be established utilizing a variety of ITU and/or non-ITU codec. For example, the communication session may be established using a non-ITU codec, such as SILK, SPEEX, ILBC, ISAC, or the like.

During the course of the communication session, quality of experience process 10 may determine 100 a plurality of quality of experience scores associated with a plurality of intrusive audio transmission samples. For example, during the course of the communication session (and/or during the course of more than one communication sessions), quality of experience process may collect a plurality of intrusive audio transmission samples. The plurality of intrusive audio transmission samples may include audio samples of the communications between user 40 and user 38 (e.g., via mobile computing device 32 and notebook computer 30, respectively), which may be intrusively analyzed to determine 100 a quality of experience score associated with each of the audio transmission samples. In an embodiment, each of the plurality of intrusive audio quality of experience scores may be represented as a mean opinion score (MOS), or other score, metric, or value that may be representative of a relative quality of experience for an end user (e.g., receiving user 38) associated with each of the intrusive audio transmission samples.

Each of the plurality of intrusive quality of experience scores may be based upon, at least in part, a comparison of a transmitted audio signal and a received audio signal. For example, quality of experience process 10 may determine 100 each of the plurality of intrusive quality of experience scores based upon, at least in part, a degradation between the transmitted audio signal an the received audio signal. For example, as shown in FIG. 3, during the course of the communication session, an audio signal may be transmitted from mobile computing device 32 to notebook computer 30 via network 14. Additionally, the transmitted audio signal from mobile computing device 32 may be sampled, or recorded, by audio recorder 150. The recorded signal from mobile computing device 32 may be an original, or transmitted signal, e.g., which may be recorded without being transmitted through network 14. Additionally, the audio signal received by notebook computer 30 (e.g., after having been transmitted through network 14) may also be recorded by audio recorder 150. The transmitted audio signal may be degraded as a result of network conditions, such as packet loss, jitter, latency, burst ratio, etc., associated with network 14. As such, the audio signal received by notebook computer 30 may be of a lower quality than the audio single transmitted from mobile computing device 32. The recorded original, or transmitted signal, from mobile computing device 32 may be compared, by intrusive analysis 152, to the recorded received audio signal from notebook computer 30 to determine a degree of quality change or degradation between the original audio signal an the received audio signal. Various metrics, such as MOS, may be utilized to represent the intrusive quality of experience score.

Various algorithms and/or techniques may be utilized by intrusive analysis 152 for measuring, or determining, a quality of experience score for the transmitted audio received by notebook computer 30. An example technique for intrusive analysis of the intrusive audio transmission samples may include the ITU-T P.862 Perceptual Evaluation of Speech Quality (PESQ) methodology. Other intrusive analysis techniques may equally be utilized. Examples of other such methodologies may include, but are not limited to, Perceptual Speech Quality Measure (PSQM), MNB, and PAMS.

The plurality of intrusive quality of experience scores may be determined 100 for a respective plurality of different network conditions. The plurality of different network conditions may include, for example, but are not limited to, different packet loss rate, different jitter, different delay, etc. In an illustrative example, network 14 may include a controllable environment, and the packet loss rate for network 14 may be varied between 0% to 40% in 0.5% increments. An intrusive quality of experience score may be determined 100 for each packet loss rate established for network 14, in a manner as generally described above (e.g., recording a transmitted audio signal and recording a received audio signal, and comparing the transmitted audio signal with the received audio signal). In other embodiments, e.g., in which network 14 may not include a controllable environment, a network condition may be determined associated with each determined 100 respective intrusive quality of experience score. Over time, the variation in network conditions may allow intrusive quality of experience scores to be determined 100 for a range of network conditions. Intrusive quality of experience scores may be determined for variations in network conditions in addition/as an alternative to packet loss rate.

Figure 4:
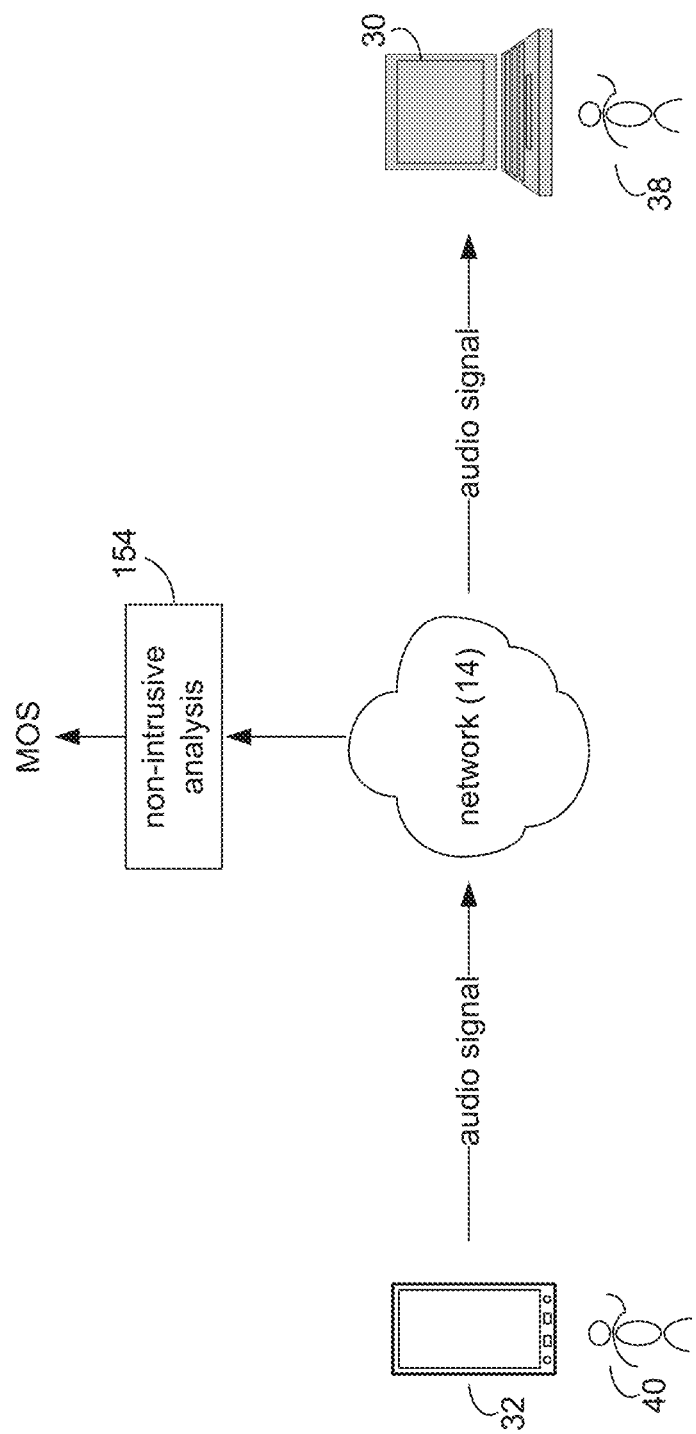
FIG. 4 diagrammatically depicts an implementation of the quality of experience process of FIG. 1, according to an example embodiment.

Referring also to FIG. 4, quality of experience process 10 may also determine 102 a plurality of non-intrusive quality of experience scores associated with a plurality of non-intrusive audio transmission samples. In a similar manner as discussed above, a media transmission (such as the communication session between mobile computing device 32 and notebook computer 30) may be established via network 14. Quality of experience process 10 may determine 102 a plurality of non-intrusive quality of experience scores associated with a plurality of transmission samples, for example, associated with a plurality of audio transmission samples taken during the course of the communication session between user 40 and user 38. In some embodiments, one or more of the plurality of non-intrusive quality of experience scores may be determined 102 during one or more separate communication sessions, or other media transmission instances.

Each of the plurality of non-intrusive quality of experience scores may be based upon, at least in part, identified network conditions. For example, for each non-intrusive transmission sample, one or more network conditions may be determined, e.g., by non-intrusive analysis 154. Non-intrusive analysis 154 may utilized one or more non-intrusive techniques or algorithms to determine 102 each of the plurality of non-intrusive quality of experience scores. An example of a non-intrusive quality of experience technique may include the ITU-T G.107 method, which may also be referred to as the E-model method. In some implementations, non-intrusive quality of experience techniques may generally provide measures of quality of service associated with the network, which may not always be accurate indicators of actual quality of experience realized by an end user (such as user 38, as a receiving participant of a portion of a communication session). Other non-intrusive quality of experience methodologies based upon, at least in part, one or more network conditions, may equally be utilized. Examples of network conditions that may be analyzed for determining 102 the plurality of non-intrusive quality of experience scores may include, but are not limited to, packet loss rate, jitter, delay, etc., associated with network 14.

The plurality of non-intrusive quality of experience scores may be determined for a respective plurality of different network conditions. The plurality of different network conditions may include, for example, but are not limited to, different packet loss rate, different jitter, different delay, etc. In a similar illustrative example as described above, network 14 may include a controllable environment, and the packet loss rate for network 14 may be varied between 0% to 40% in 0.5% increments. A non-intrusive quality of experience score may be determined 102 for each packet loss rate established for network 14, in a manner as generally described above (e.g., determining one or more network conditions and implementing a non-intrusive analysis technique). In other embodiments, e.g., in which network 14 may not include a controllable environment, a network condition may be determined associated with each determined 102 respective non-intrusive quality of experience score. Over time, the variation in network conditions may allow non-intrusive quality of experience scores to be determined 102 for a range of network conditions. Non-intrusive quality of experience scores may be determined for variations in network conditions in addition/as an alternative to packet loss rate.

The plurality of non-intrusive audio transmission samples may be obtained during the same communication session, or during a different communication session, than the plurality of intrusive audio transmission samples. In an embodiment in which the plurality of non-intrusive audio transmission samples may be obtained during the same communication session as the plurality of intrusive audio transmission samples, each non-intrusive audio transmission sample may be obtained at a generally similar time frame as a corresponding intrusive audio transmission sample. Other configurations may equally be implemented.

Figure 5:
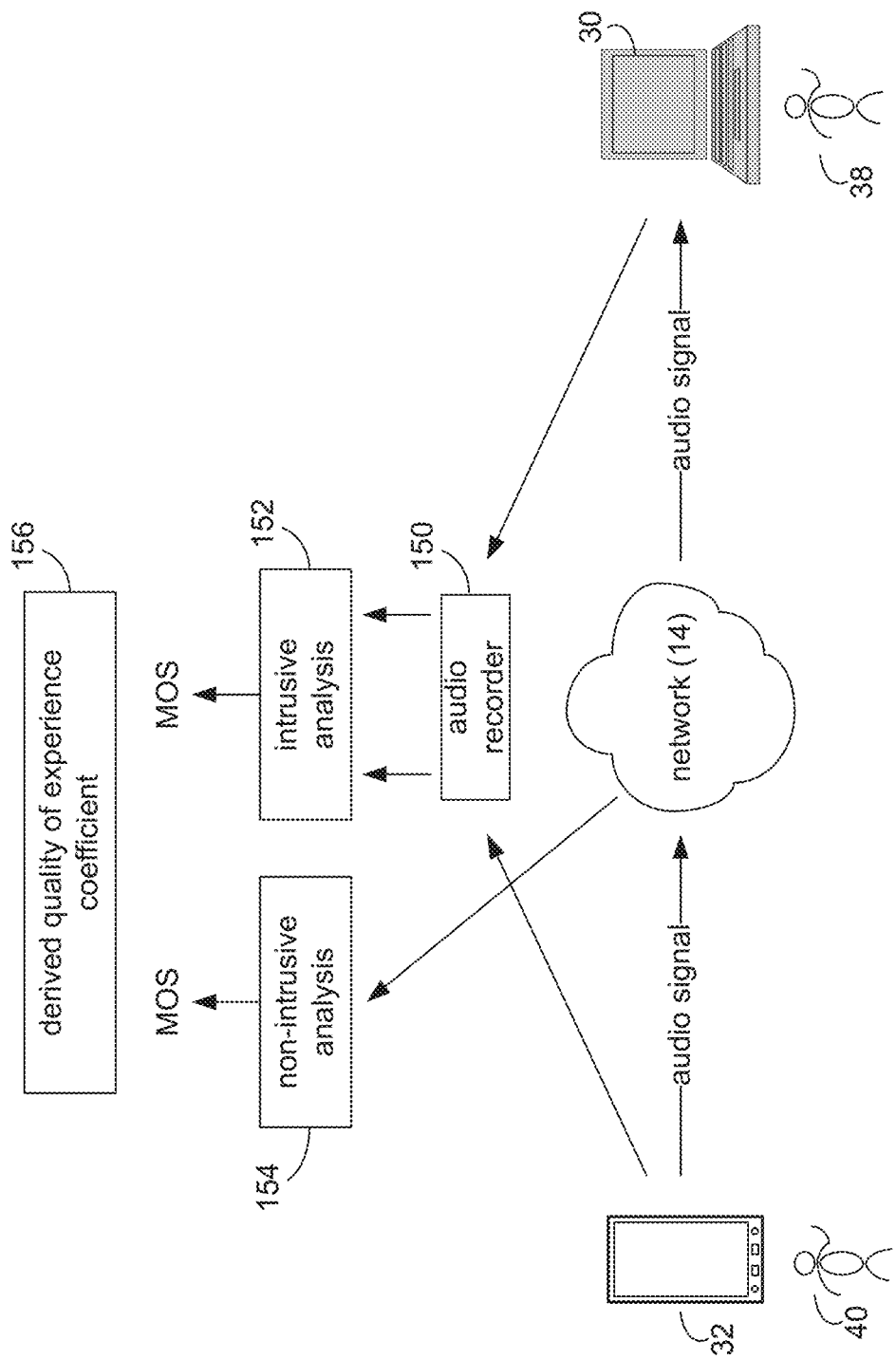
FIG. 5 diagrammatically depicts an implementation of the quality of experience process of FIG. 1, according to an example embodiment.

Quality of experience process 10 may further derive 104 a quality of experience coefficient based upon a relationship between the plurality of intrusive quality of experience scores and the plurality of non-intrusive quality of experience scores. For example, and referring also to FIG. 5, quality of experience process 10 may derive 104 the relationship between the quality of experience score determined 100 by intrusive analysis 152 and the quality of experience score determined 102 by non-intrusive analysis (e.g., which may provide the main network quality of service factors that may effect quality of experience) for the different network conditions. In an embodiment, deriving 104 the relation between the intrusive testing and the non-intrusive testing may utilize curve fitting techniques, such as by an approximation of a non-linear regression model.

The derived quality of experience coefficient may be a codec specific coefficient. Continuing with the above example in which a quality of experience associated with a communication session may be determined 100, 102, as discussed above the communication session may be established utilizing a given codec (e.g., an ITU codec and/or a non-ITU codec, such as SILK, SPEEX, ILBC, etc.). Accordingly, the plurality of intrusive quality of experience scores and the plurality of non-intrusive quality of experience scores may be relevant to the codec utilized for the communication session. Further, the derived 104 quality of experience coefficient may be relevant to the same codec, giving rise to a codec specific coefficient. Accordingly, the same process as generally described above may be carried out for a variety of different codecs, thereby providing a corresponding variety of codec specific coefficients.

Figure 6:
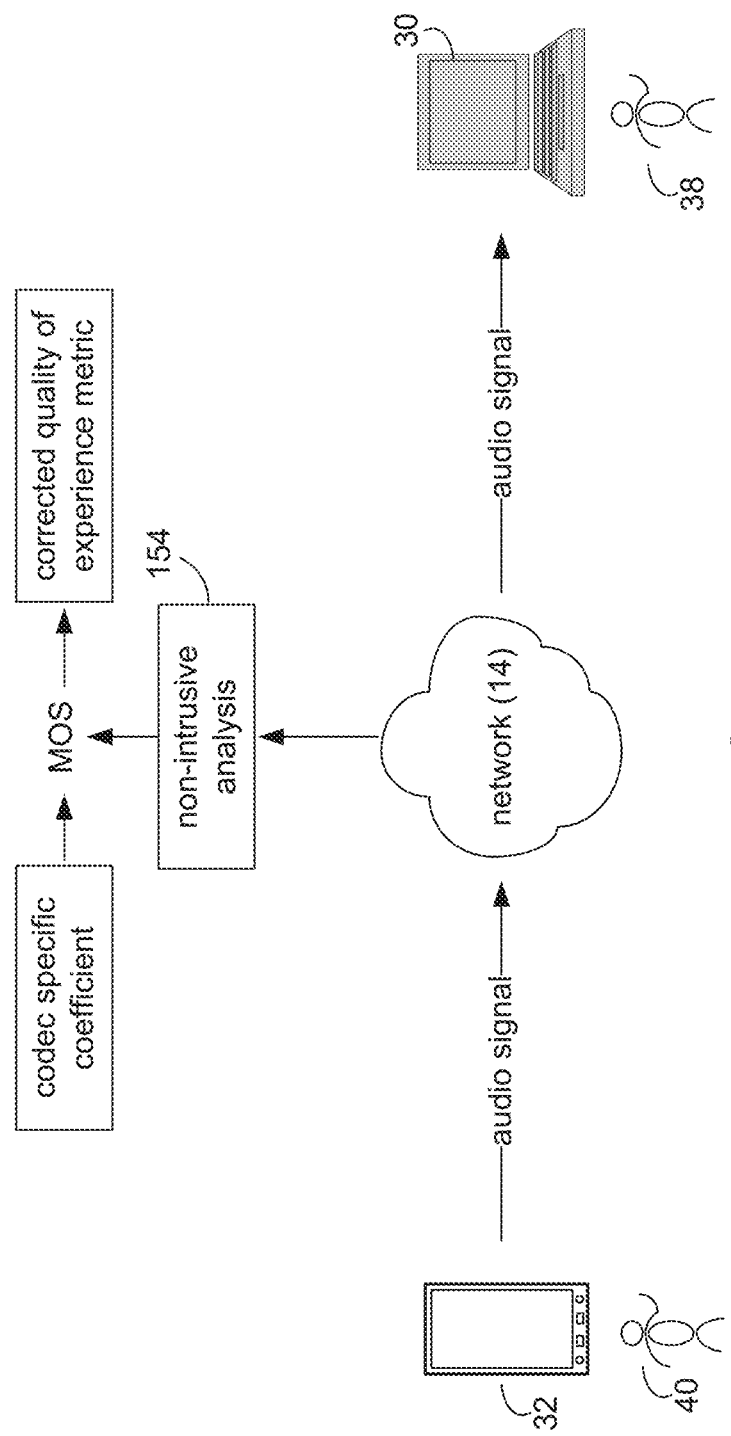
FIG. 6 diagrammatically depicts an implementation of the quality of experience process of FIG. 1, according to an example embodiment.

Quality of experience process 10 may allow the derived quality of experience coefficient to be utilized determine the quality of experience associated with streaming media, such transmitted audio of a communication session. As generally described above, in some implementations quality of experience process 10 may also the quality of experience associated with streaming media to be determined in real-time and/or near real-time. In an illustrative example, as shown in FIG. 6, users 38 and 40 may participate in a communication session, e.g., via notebook computer 30 and mobile computing device 32 respectively. Quality of experience process 10 may allow a quality of experience, as observed by an end user (e.g., a participant in a communication session, such as user 38 and/or user 40) to be determined at any point in time during the communication session. For example, quality of experience process 10 may determine 106 a non-intrusive quality of experience associated with an audio transmission, e.g., via non-intrusive analysis 154. Quality of experience process 10 may determine 106 the non-intrusive quality of experience intermittently and/or periodically. An interval for intermittently determining 106 the non-intrusive quality of experience associated with the communication session may be determined, for example, to provide relatively low additional demands on network 14. As such, determining 106 the non-intrusive quality of experience associated with the communication session may typically not negatively impact network 14, which could thereby degrade the quality of experience associated with the communication session. For example, quality of experience process 10 may determine 106 the non-intrusive quality of experience associated with the communication session every 1-20 seconds. It will be appreciated that other time intervals may equally be utilized.

Quality of experience process 10 may apply 108 the codec specific coefficient to the non-intrusive quality of experience score to obtain a corrected quality of experience metric. The codec specific coefficient may correspond to the codec that is utilized for conducing the communication session between user 38 and user 40. As such, a codec specific coefficient may be applied 108 that may represent the relationship between a non-intrusive quality of experience score associated with the communication session (which may utilize the specific codec) and a quality of experience that may be observed by an end user. As a result of applying 108 the codec specific coefficient to the determined 106 non-intrusive quality of experience score, a corrected quality of experience metric may be provided, which may relatively accurately indicate a quality of experience for the communication session as may be observed by a participant in the communication session (e.g., by user 38 and user 40 in the illustrated embodiment).

Accordingly, in some embodiments, quality of experience process 10 may provide a single metric to quantify a quality of experience associated with streaming media, such as audio in an communication session, or the like. The single metric may be non-intrusively obtained, and may provide a real-time and/or near real-time measure of the quality of experience, e.g., as may be observed by an end user, such as a participant in a communication session (e.g., user 38, in the illustrative example). The single metric may allow, for example, real-time and/or near real-time dynamic resource management and/or tuning of the network and/or communication session attributes (such as error correction, etc.) during the course of a communication session. In some embodiments, quality of experience process 10 may be implemented as a plug-in, or feature of, a softphone application, or other communication application.

Figure 7:
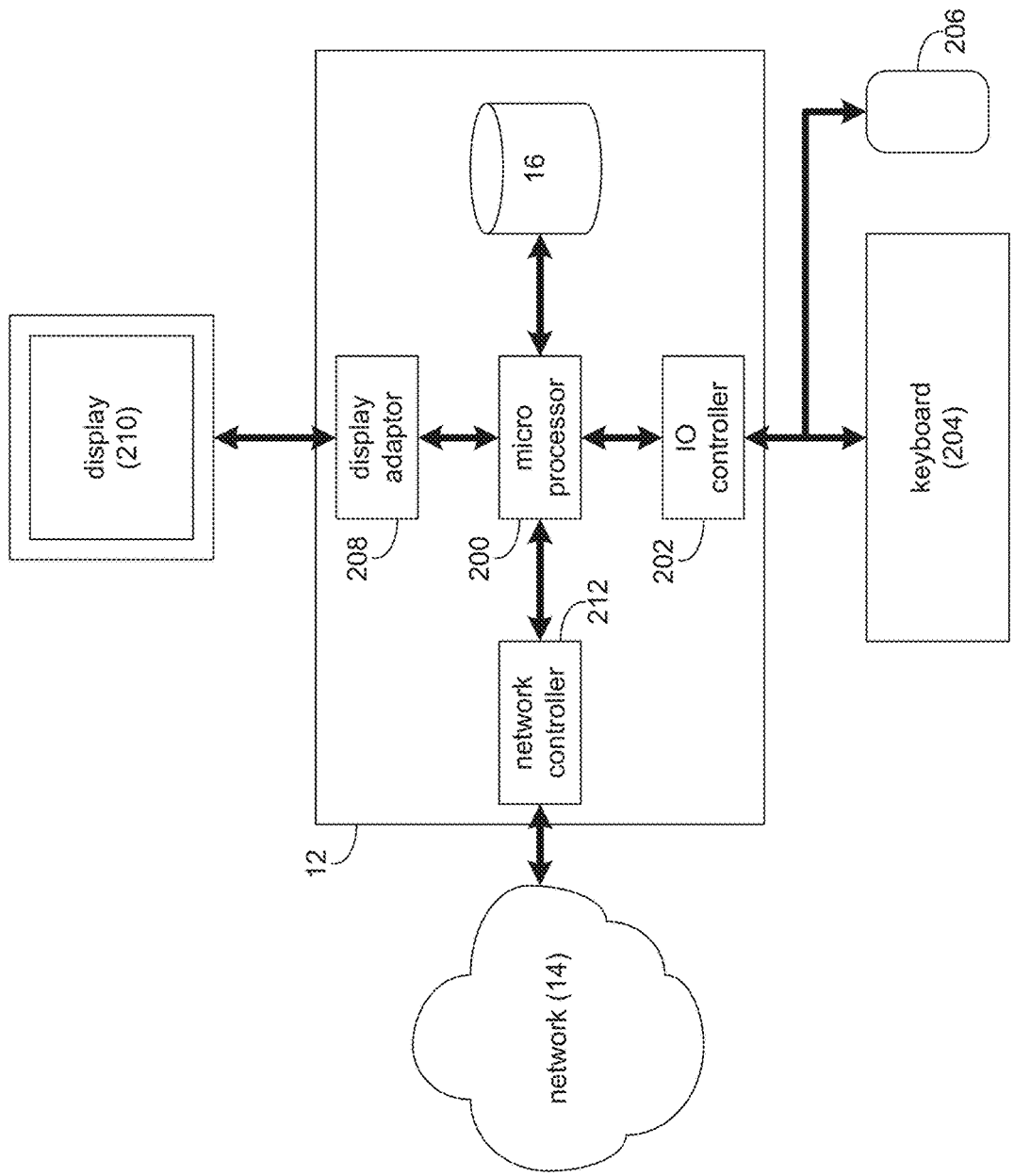
FIG. 7 is a diagrammatic view of the computing device of FIG. 1, according to an implementation of the present disclosure.

Referring also to FIG. 7, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, quality of experience process 10 may be substituted for computing device 12 within FIG. 7, examples of which may include but are not limited to client electronic devices 28, 30, 32, 34.

Computing system 12 may include microprocessor 200 configured to e.g., process data and execute instructions/code for quality of experience process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but is not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
determining, by a processor, a plurality of intrusive quality of experience scores associated with a plurality of intrusive audio transmission samples during a communication session between a first user device and a second user device over a network, wherein the network includes a controllable environment configured to vary network jitter values in increment, wherein the plurality of intrusive quality of experience scores are determined for a respective plurality of different network jitter values;
determining, by the processor, a plurality of non-intrusive quality of experience scores associated with a plurality of non-intrusive audio transmission samples, wherein each non-intrusive audio transmission sample of the plurality of non-intrusive audio transmission samples is obtained at a same time frame during the communication session as a corresponding intrusive audio transmission sample of the plurality of intrusive audio transmission samples and wherein the plurality of non-intrusive quality of experience scores are determined for the respective plurality of different network jitter values;
deriving, by the processor, a quality of experience coefficient based upon a relationship between the plurality of intrusive quality of experience scores and the plurality of non-intrusive quality of experience scores based on approximation of a non-linear regression model;
determining a non-intrusive quality of experience score associated with an audio transmission; and
applying the quality of experience coefficient to the non-intrusive quality of experience score, resulting in a corrected non-intrusive quality of experience score associated with the audio transmission between a first user device and a second user device.

2. The computer-implemented method of claim 1, wherein each of the plurality of intrusive quality of experience scores are based upon, at least in part, a comparison of a transmitted audio signal and a received audio signal.

3. The computer-implemented method of claim 1, wherein the plurality of intrusive quality of experience scores are determined for a respective plurality of different network conditions.

4. The computer-implemented method of claim 1, wherein each of the plurality of non-intrusive quality of experience scores are based upon, at least in part, identified network conditions.

5. The computer-implemented method of claim 1, wherein the plurality of non-intrusive quality of experience scores are determined for a respective plurality of different network conditions.

6. The method of claim 3, wherein the plurality of different network conditions includes different packet loss rates up to 40% in increments of 0.5%.

7. The method of claim 1, wherein the derived quality of experience coefficient is a codec specific coefficient.

8. A computer program product comprising a computer readable medium having a plurality of instructions stored thereon, which, when executed by a processor, cause the processor to perform operations including:
determining a plurality of intrusive quality of experience scores associated with a plurality of intrusive audio transmission samples during a communication session between a first user device and a second user device over a network, wherein the network includes a controllable environment configured to vary network jitter values in increment, wherein the plurality of intrusive quality of experience scores are determined for a respective plurality of different network jitter values;

determining a plurality of non-intrusive quality of experience scores associated with a plurality of non-intrusive audio transmission samples, wherein each non-intrusive audio transmission sample of the plurality of non-intrusive audio transmission samples is obtained at a same time frame during the communication session as a corresponding intrusive audio transmission sample of the plurality of intrusive audio transmission samples and wherein the plurality of non-intrusive quality of experience scores are determined for the respective plurality of different network jitter values;

deriving a quality of experience coefficient based upon a relationship between the plurality of intrusive quality of experience scores and the plurality of non-intrusive quality of experience scores based on an approximation of a non-linear regression model;

determining a non-intrusive quality of experience score associated with an audio transmission;

applying the quality of experience coefficient to the non-intrusive quality of experience score, resulting in a corrected non-intrusive quality of experience score associated with the audio transmission between a first user device and a second user device;

wherein the computer readable medium is not transitory per se.

9. The computer program product of claim 8, wherein each of the plurality of intrusive quality of experience scores are based upon, at least in part, a comparison of a transmitted audio signal and a received audio signal.

10. The computer program product of claim 8, wherein the plurality of intrusive quality of experience scores are determined for a respective plurality of different network conditions.

11. The computer program product of claim 8, wherein each of the plurality of non-intrusive quality of experience scores are based upon, at least in part, identified network conditions.

12. The computer program product of claim 8, wherein the plurality of non-intrusive quality of experience scores are determined for a respective plurality of different network conditions.

13. The computer program product of claim 10, wherein the plurality of different network conditions includes different packet loss rates up to 40% in increments of 0.5%.

14. The computer program product of claim 8, wherein the derived quality of experience coefficient is a codec specific coefficient.

15. A computing system comprising:
a processor and a memory module coupled with the processor, the processor being configured for:

determining a plurality of intrusive quality of experience scores associated with a plurality of intrusive audio transmission samples during a communication session between a first user device and a second user device over a network, wherein the network includes a controllable environment configured to vary network jitter values in increment, wherein the plurality of intrusive quality of experience scores are determined for a respective plurality of different network jitter values;

determining a plurality of non-intrusive quality of experience scores associated with a plurality of non-intrusive audio transmission samples, wherein each non-intrusive audio transmission sample of the plurality of non-intrusive audio transmission samples is obtained at a same time frame during the communication session as a corresponding intrusive audio transmission sample of the plurality of intrusive audio transmission samples and wherein the plurality of non-intrusive quality of experience scores are determined for the respective plurality of different network jitter values;

deriving a quality of experience coefficient based upon a relationship between the plurality of intrusive quality of experience scores and the plurality of non-intrusive quality of experience scores based on an approximation of a non-linear regression model;

determining a non-intrusive quality of experience score associated with an audio transmission; and applying the quality of experience coefficient to the non-intrusive quality of experience score, resulting in a corrected non-intrusive quality of experience score associated with the audio transmission between a first user device and a second user device.

16. The computing system of claim 15, wherein each of the plurality of intrusive quality of experience scores are based upon, at least in part, a comparison of a transmitted audio signal and a received audio signal.

17. The computing system of claim 15, wherein the plurality of intrusive quality of experience scores are determined for a respective plurality of different network conditions.

18. The computing system of claim 15, wherein each of the plurality of non-intrusive quality of experience scores are based upon, at least in part, identified network conditions.

19. The computing system of claim 17, wherein the plurality of different network conditions includes different packet loss rates up to 40% in increments of 0.5%.

20. The computing system of claim 15, wherein the derived quality of experience coefficient is a codec specific coefficient.

* * * * *